US012258246B2

(12) United States Patent
Deniken

(10) Patent No.: US 12,258,246 B2
(45) Date of Patent: *Mar. 25, 2025

(54) APPARATUS FOR LIFTING AND LOWERING MANHOLE COVERS

(71) Applicant: Paul Deniken, West Chester, PA (US)

(72) Inventor: Paul Deniken, West Chester, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/430,736

(22) Filed: Feb. 2, 2024

(65) Prior Publication Data

US 2024/0174502 A1 May 30, 2024

Related U.S. Application Data

(63) Continuation of application No. 18/368,068, filed on Sep. 14, 2023, now Pat. No. 11,939,196.

(60) Provisional application No. 63/406,541, filed on Sep. 14, 2022.

(51) Int. Cl.
*B66F 19/00* (2006.01)
*B66C 1/04* (2006.01)
*B66C 1/34* (2006.01)

(52) U.S. Cl.
CPC .............. *B66F 19/005* (2013.01); *B66C 1/04* (2013.01); *B66C 1/34* (2013.01)

(58) Field of Classification Search
CPC . B66F 19/005; B66C 1/04; B66C 1/34; B66C 1/14; B66C 1/502; B66C 1/025; B66C 23/36; B66C 23/365; B66D 1/28; B66D 1/60; B66D 3/26
See application file for complete search history.

(56) References Cited

U.S. PATENT DOCUMENTS 5,176,365 A * 1/1993 Best ...................... B66F 19/005 248/500
5,993,106 A * 11/1999 Huang ...................... B66F 3/12 404/26
7,731,451 B2 * 6/2010 Roberts ................. B66F 19/005 404/86
2007/0269267 A1 * 11/2007 Roberts ................. B66F 19/005 404/73
2009/0279993 A1 * 11/2009 Roberts ................. B66F 19/005 414/592
2013/0280020 A1 * 10/2013 O'Brien .................. B66C 23/44 414/543
2018/0057334 A1 * 3/2018 Poczciwinski ........ B66F 19/005

FOREIGN PATENT DOCUMENTS

CA 3104460 A1 * 7/2021 ............... B66C 1/06

* cited by examiner

*Primary Examiner* — Emmanuel M Marcelo
(74) *Attorney, Agent, or Firm* — IP WORKS

(57) ABSTRACT

An apparatus for lifting and lowering manhole covers is shown and described. The apparatus for lifting and lowering manhole covers includes a main beam secured to a vehicle connection support. A winch is secured along the main beam. The winch is configured to secure to a manhole cover. A support leg secured to the main beam such that the winch is positioned between the vehicle connection support and the support leg.

10 Claims, 3 Drawing Sheets

APPARATUS FOR LIFTING AND LOWERING MANHOLE COVERS

CROSS REFERENCE TO RELATED APPLICATIONS

This application claims the benefit of U.S. patent application Ser. No. 18/368,068 filed on Sep. 14, 2023, which claims the benefit of U.S. Provisional Application No. 63/406,541 filed on Sep. 14, 2022. The above identified patent application is herein incorporated by reference in its entirety to provide continuity of disclosure.

BACKGROUND OF THE INVENTION

The present invention relates to a device for enabling the removal of a manhole cover. More particularly, the present invention provides a device which connects to the hitch of a vehicle and allows one to raise and remove a manhole cover.

Often times when maintenance to utilities, or when new utility lines need run, they are placed underground. In order to access these lines often times manhole covers will need to be removed. Typically, manhole covers are of a nature that they may be driven over. This means that they are made from a thick and heavy steel or other metal material.

As covers are driven over, or as the elements and grime work their way into the gaps of these covers, they can become increasingly difficult to move or may even be stuck in place. Between the weight, and the added elements, tools or machinery are required to remove these covers. Currently, the state of the art includes hand tools which help to distribute the weight via levers or similar. However, these tools still leave a bulk of the work to manual labor.

Other tools in the arts may assist in lifting the cover or even in moving it away from the manhole. However, each of these tools has a drawback, or a combination of drawbacks. In one instance, the lifting device does not have adequate support. This leads to a limited life of the device. In another instance, the devices may remove the manual labor and be well supported. However, they are bulky and require a significant amount of setup and breakdown before and after each use.

Consequently, there is a need for an improvement in the art of removing manhole covers. The present invention substantially diverges in design elements from the known art while at the same time solves a problem many people face when needing to remove a manhole cover. In this regard the present invention substantially fulfills these needs.

SUMMARY OF THE INVENTION

The present invention provides an apparatus for lifting and lowering manhole covers wherein the same can be utilized for providing convenience for the user when needing to remove or replace a manhole cover. The apparatus for lifting and lowering manhole covers includes a main beam secured to a vehicle connection support. A winch is secured along the main beam. The winch is configured to secure to a manhole cover.

Another object of the apparatus for lifting and lowering manhole covers is to have a support leg secured to the main beam. The winch is positioned between the vehicle connection support and the support leg.

Another object of the apparatus for lifting and lowering manhole covers is to have a magnet secured to the winch. The magnet is configured to secure to a manhole cover.

Another object of the apparatus for lifting and lowering manhole covers is to have the winch secured to a winch connector. The winch connector is then secured to the main beam.

Another object of the apparatus for lifting and lowering manhole covers is to have the main beam include a plurality of apertures there along.

Another object of the apparatus for lifting and lowering manhole covers is to have the winch connector secured to the main beam via locking pins and the plurality of apertures.

Another object of the apparatus for lifting and lowering manhole covers is to have the main beam be rotatably secured to the vehicle connection support.

Another object of the apparatus for lifting and lowering manhole covers is to have the main beam and the vehicle connection support each include a stop plate. The stop plates will contact each other and ensure a proper connection of the main beam and the vehicle connection support.

Another object of the apparatus for lifting and lowering manhole covers is to have each stop plate has at least one aperture therethrough which will align. A pin is removably placed through the at least one aperture locking the apparatus for lifting and lowering manhole covers in place.

Another object of the apparatus for lifting and lowering manhole covers is to have the support leg comprised of a wheel secured at one end.

Another object of the apparatus for lifting and lowering manhole covers is to have the support leg have an adjustable height.

Other objects, features and advantages of the present invention will become apparent from the following detailed description taken in conjunction with the accompanying drawings.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

LIST OF REFERENCE NUMERALS

Figure 1:
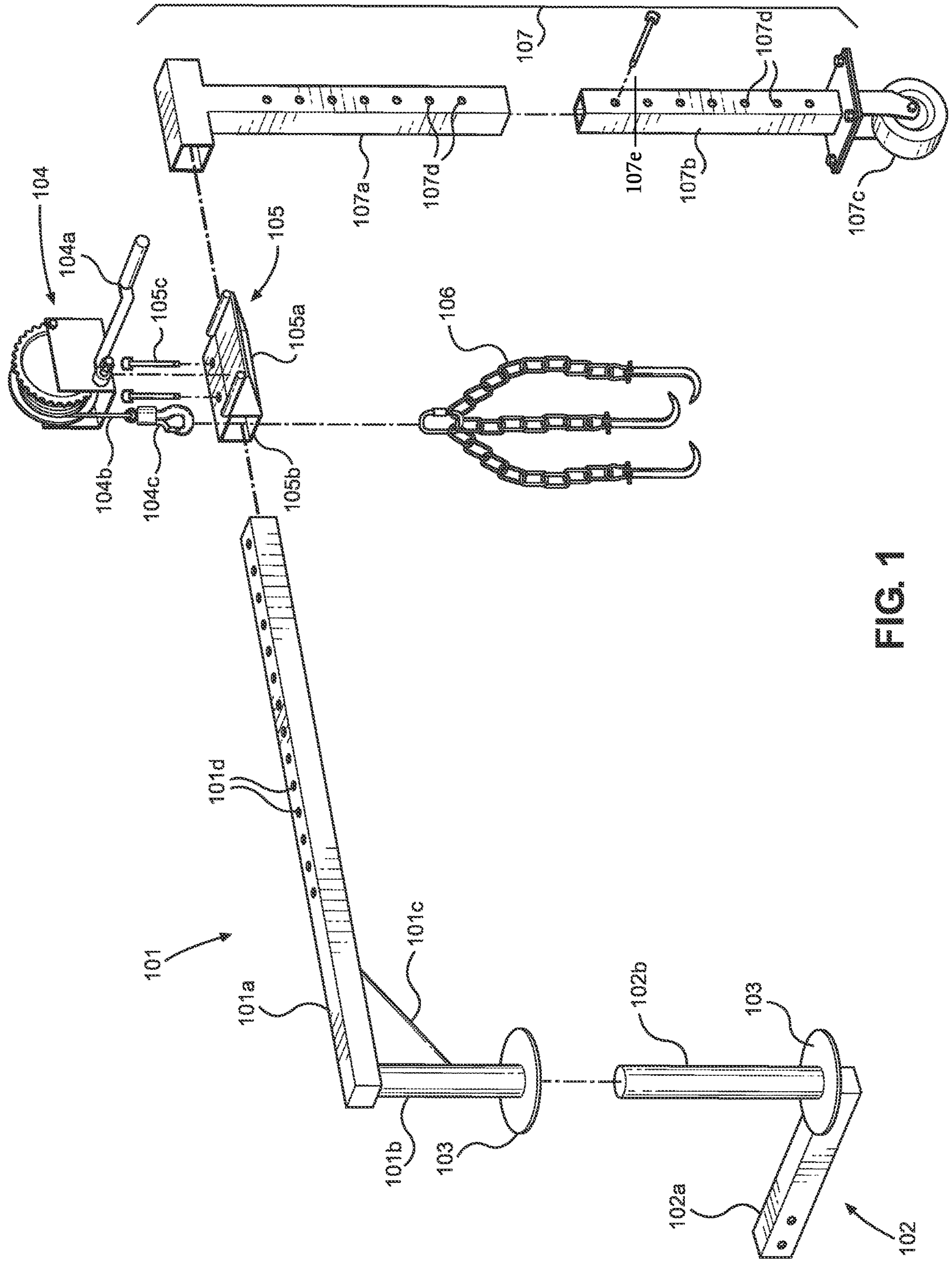
FIG. 1 shows an exploded view of an embodiment of the apparatus for lifting and lowering manhole covers.

With regard to the reference numerals used, the following numbering is used throughout the drawings.

| | |
|---|---|
| 101 | Main support beam |
| 101a | First bar |
| 101b | Second bar |
| 101c | Extra support |
| 101d | Apertures |
| 101e | Locking Pin |
| 102 | Vehicle connection support |
| 102a | Square tube |
| 102b | Vertical connection |
| 103 | Stop plates |
| 104 | Winch |
| 104a | Crank |

-continued

| | |
|---|---|
| 104b | Strap or cable |
| 104c | Hook |
| 105 | Winch connector |
| 105a | Connection plate |
| 105b | Tube |
| 105c | Locking pin |
| 106 | Hooks |
| 107 | Support leg |
| 107a | First section |
| 107b | Second section |
| 107c | Wheel |
| 107d | Apertures |
| 107e | Locking pin |
| 201 | Magnet |
| 301 | Vehicle |
| 302 | Manhole cover |
| 303 | Manhole |
| 304 | Apertures |
| 305 | Pin |

DETAILED DESCRIPTION OF THE INVENTION

Reference is made herein to the attached drawings. Like reference numerals are used throughout the drawings to depict like or similar elements of the apparatus for lifting and lowering manhole covers. For the purposes of presenting a brief and clear description of the present invention, a preferred embodiment will be discussed as used for the apparatus for lifting and lowering manhole covers. The figures are intended for representative purposes only and should not be considered to be limiting in any respect.

Referring now to FIG. 1, there is shown an exploded view of an embodiment of the apparatus for lifting and lowering manhole covers. The apparatus for lifting and lowering manhole covers is comprised of several main features and several optional features. However, several of these optional features will significantly improve the functionality. The apparatus for lifting and lowering manhole covers is comprised of a main support beam 101. The main support beam 101 is made up of a first bar 101*a* and a second bar 101*b*. In one embodiment the first bar 101*a* has a plurality of apertures 101*d* there along.

The first bar 101*a* and the second bar 101*b* are connected together at one end of each bar. In one embodiment the connection is perpendicular. In another embodiment the connection is at a suitable angle that will allow for full functionality of the apparatus for lifting and lowering manhole covers.

In some embodiments an extra support 101*c* is included within the main support beam 101. This extra support 101*c* will better ensure that the connection between the first bar 101*a* and the second bar 101*b* stays intact and does not bend. Further, the second bar 101*b* has an opening at one end. The opening is configured to accept the vehicle connection support 102.

In the shown embodiment the vehicle connection support 102 is comprised of a square tube 102*a* which is configured to be received by a vehicle hitch connection. At the end of the square tube 102*a* opposite the vehicle hitch mount there is a substantially vertical connection 102*b*. In the shown embodiment the vertical connection 102*b* is round. This will allow for the apparatus for lifting and lowering manhole covers to swivel. In another embodiment the vertical connection 102*b* is a square bar. This will prevent any movement in the apparatus for lifting and lowering manhole covers. In some embodiments the second bar 101*b* and the vertical connection support 102*b* each include a stop plate 103. The stop plate 103 will act as supports and washers to allow for swiveling.

In one embodiment a winch 104 is secured directly to the first bar 101*a*. In the shown embodiment the winch 104 includes a crank 104*a*, which is configured to wind a strap or cable 104*b* around the winch 104. In another embodiment the winch 104 is an electric winch or other winch that does not require manual force be applied. In one embodiment the winch 104 is configured to include a stop such that the winch strap or cable 104*b* is held in place. The winch strap or cable 104*b* has a hook 104*c* secured to one end.

In one embodiment the winch 104 is secured to a winch connector 105. The winch connector 105 is then secured to the first bar 101*a*. The winch connector 105 includes a connection plate 105*a* which is secured to a tube 105*b* having a cross section which is similar to and slightly larger than the first bar 101*a*. This will allow for the winch connector 105 to slide along the first bar 101*a*.

In one embodiment, while not shown in this FIG. the first bar 101*a* includes a plurality of holes which run along the top surface and the bottom surface of the first bar 101*a*. This allows for a winch connector 105 to be movably secured thereto. In one embodiment at least one locking pin 105*c* is used to secure the winch connector 105 in place along the first bar 101*a*.

In one embodiment the hook 104*c* of the winch 104 is secured to at least one hook 106. This will allow for the winch 104 to be secured to a manhole cover for removal. In the shown embodiment the winch 104 is secured to three hooks 106. In different embodiments the hooks 106 may be of various shapes and configurations as required by specific manholes. It is contemplated as part of this disclosure that hooks 106 represents any type of connection device required to connect to a manhole cover. Each hook 106 is secured to a chain such that the hooks 106 may be easily manipulated and secured to a manhole cover. Once the hooks 106 are secured the winch can be used to remove the manhole cover.

The apparatus for lifting and lowering manhole covers further includes a support leg 107. In the shown embodiment the support leg 107 includes a first section 107*a*, a second section 107*b* and a wheel 107*c*. The first section 107*a* includes a tube having a cross section which is similar to and slightly larger than the first bar 101*a*. This will allow for the support leg 107 to slide along the first bar 101*a*. In one embodiment the support leg 107 is secured to the first bar 101*a* using at least one locking pin 107*e*. The first section 107*a* includes a substantially vertical part. This vertical part is configured to secure to the second section 107*b*.

In one embodiment the second section 107*b* is configured to fit within the first section 107*a*. In another embodiment there are a plurality of apertures 107*d* which run the length of the first section 107*a* and the second section 107*b*. This will allow for at least one locking pin 107*e* to be used to secure the first section 107*a* and the second section 107*b* together. This will also allow for the height of the support leg 107 to be adjustable.

In the shown embodiment a wheel 107*c* is secured to the base of the second section 107*b*. This will allow for the apparatus for lifting and lowering manhole covers to swivel in use. In one embodiment the wheel 107*c* is a castor wheel. This will allow for full functionality and little maintenance.

Figure 2:
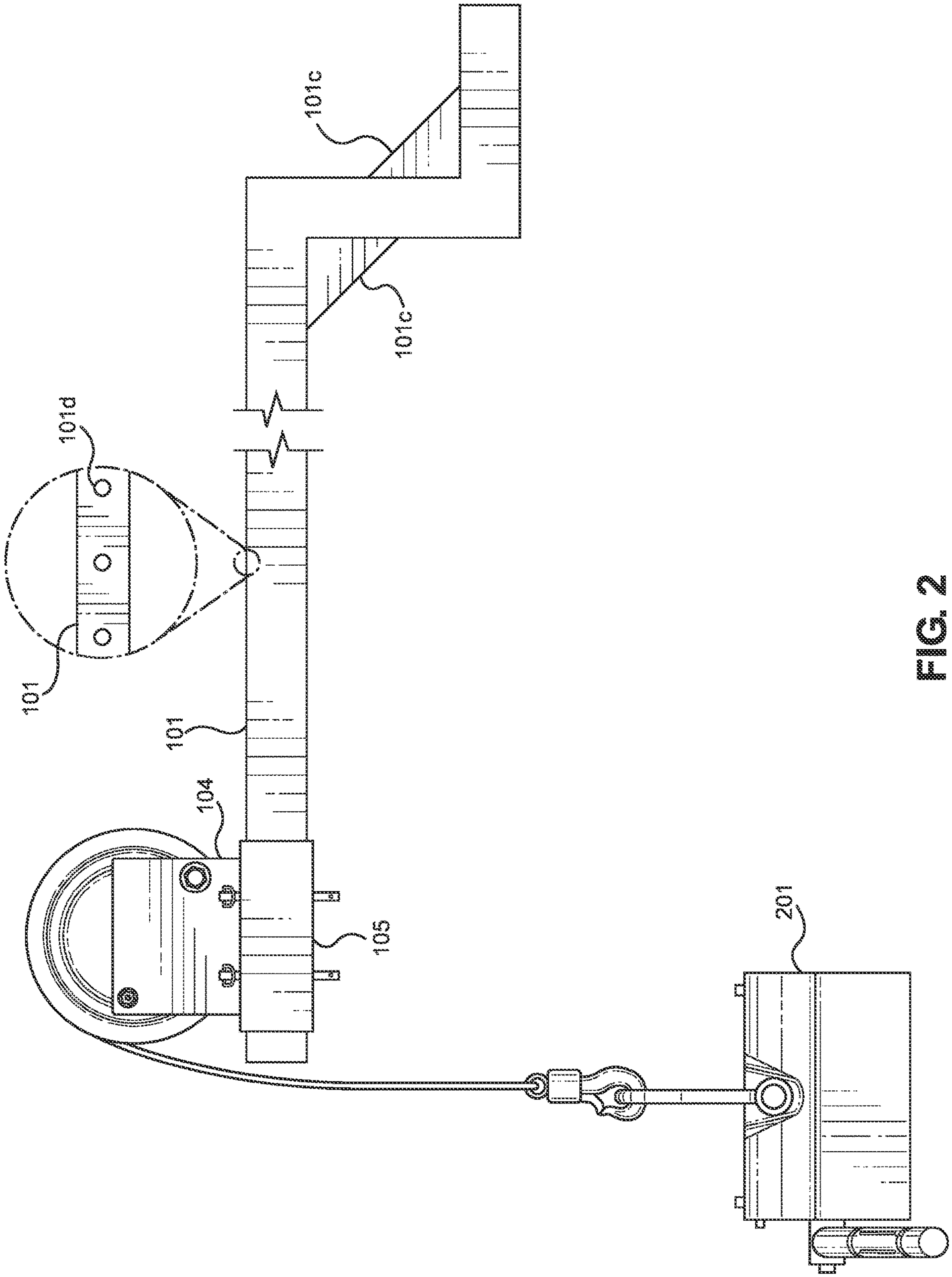
FIG. 2 shows a perspective view of an embodiment of the apparatus for lifting and lowering manhole covers.

Referring now to FIG. 2, there is shown a perspective view of an embodiment of the apparatus for lifting and lowering manhole covers. In one embodiment the apparatus for lifting and lowering manhole covers includes a main support beam 101 which is fixed to the vehicle connection support 102. In this embodiment there are two extra supports 101*c*, one for the main support beam 101 and one which helps to secure the main support beam 101 to the vehicle connection support 102.

In the shown embodiment there are a fixed set of apertures 101*d* along the main beam 101. This will allow for the winch connector 105 to be secured at any of the fixed points. In this embodiment there is a set of apertures 101*d* located at either end of the main support beam 101 and another set roughly in the middle of the main support beam 101. This allows for three different securement locations of the winch connector 105 along the main support beam 101.

The apparatus for lifting and lowering manhole covers includes a winch 104 including a steel cable. In this embodiment the winch is connected to a magnet 201. The magnet 201 will allow for an easy connection to be made to any manhole cover. In the shown embodiment the magnet 201 has the ability to be engaged and disengaged.

In this embodiment a manhole cover can be lifted as desired via the magnetic connection. The vehicle which the apparatus for lifting and lowering manhole covers is secured to will then be able to move away from the manhole leaving the manhole exposed and the cover removed.

Figure 3:
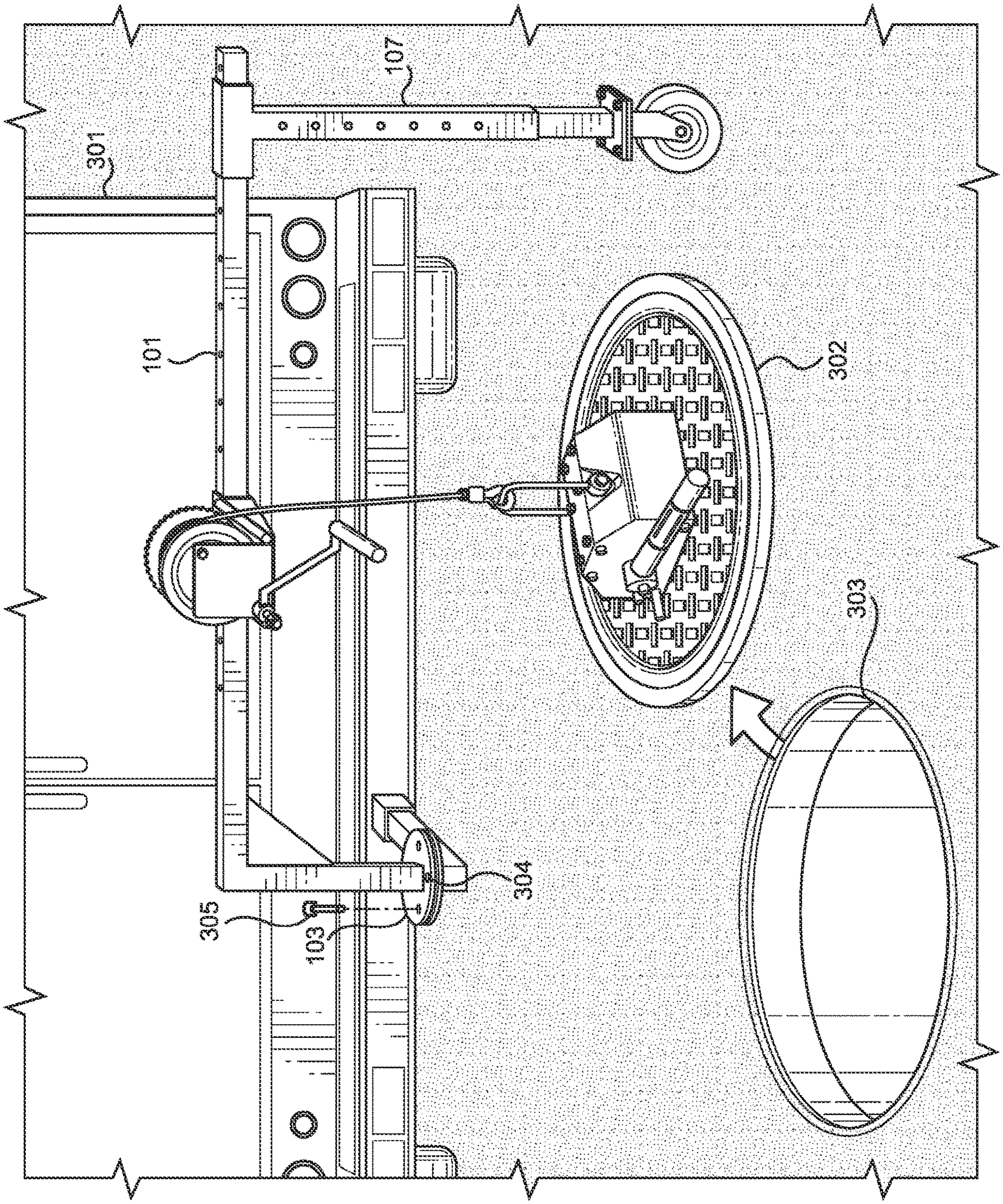
FIG. 3 shows a perspective in use view of an embodiment of the apparatus for lifting and lowering manhole covers.

Referring now to FIG. 3, there is shown a perspective in use view of an embodiment of the apparatus for lifting and lowering manhole covers. In this embodiment the apparatus for lifting and lowering manhole covers is shown in use. The apparatus for lifting and lowering manhole covers is secured to a vehicle 301. The manhole cover 302 has been removed leaving the manhole 303 exposed. In this embodiment the vehicle 301 did not have to move in order for the manhole cover 302 to be removed.

In this embodiment one can see that the main support beam 101 is approximately half as long as the width of the vehicle 301. This will allow for the apparatus for lifting and lowering manhole covers to stay secured to the vehicle 301 for transport. In one embodiment the apparatus for lifting and lowering manhole covers may have the support leg 107 removed. The apparatus for lifting and lowering manhole covers may then be turned and secured to the vehicle 301.

In one embodiment the apparatus for lifting and lowering manhole covers includes a plurality of apertures 304 located within the stop plates 103. These apertures 304 are configured to accept a pin 305 there through. In various embodiments the apertures 304 can be in different locations. However, the aperture 304 shall align at different angles as compared to the vehicle 301. When the pin 305 is secured the apparatus for lifting and lowering manhole covers will be locked into place.

This allows, for example, the apparatus for lifting and lowering manhole covers to be locked at approximately a 90-degree angle for securing and lifting the manhole cover 302. In this example once the manhole cover 302 is lifted and the pin 305 is removed and the apparatus for lifting and lowering manhole covers can be rotated to approximately parallel with the vehicle 301 (as shown). The pin 305 can then be reinserted through the apertures 304. This will lock the apparatus for lifting and lowering manhole covers in place ensuring the manhole cover 302 stays away from the manhole 303. The degrees in the preceding description are merely examples and the ability to lock the apparatus for lifting and lowering manhole covers at various different degrees shall not be considered a departure from the present invention.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

The invention claimed is:

1. An apparatus for lifting and lowering manhole covers, the apparatus comprising:
- a main support beam secured to a vehicle connection support;
- a winch secured along the main support beam;
- wherein
- the winch is configured to secure to a manhole cover,
- the main support beam is rotatably secured to the vehicle connection support, and
- the main support beam includes a stop plate connected to a stop plate on the vehicle connection support.

2. The apparatus for lifting and lowering manhole covers of claim 1, further comprising a magnet secured to the winch, wherein the magnet is configured to secure to a manhole cover.

3. The apparatus for lifting and lowering manhole covers of claim 2, wherein the main support beam includes a plurality of apertures there along.

4. The apparatus for lifting and lowering manhole covers of claim 1, further comprising at least one hook secured to the winch, wherein the at least one hook is configured to secure to a manhole cover.

5. The apparatus for lifting and lowering manhole covers of claim 1, wherein each stop plate has at least one aperture therethrough which is configured to align;
- a pin is removably placed through the at least one aperture locking the apparatus for lifting and lowering manhole covers in place.

6. An apparatus for lifting and lowering manhole covers, the apparatus comprising:
- a main support beam secured to a vehicle connection support;
- a winch secured along the main support beam;
- a support leg secured to the main support beam,
- wherein,
- the winch is configured to secured to a manhole cover;
- the winch is positioned between the vehicle connection support and the support leg,
- the main support beam is rotatably secured to the vehicle connection support, and
- the main support beam includes a stop plate connected to a stop plate on the vehicle connection support.

7. The apparatus for lifting and lowering manhole covers of claim 6, further comprising a magnet secured to the winch, wherein the magnet is configured to secure to a manhole cover.

8. The apparatus for lifting and lowering manhole covers of claim 6, wherein the support leg has an adjustable height.

9. The apparatus for lifting and lowering manhole covers of claim 6, wherein each stop plate has at least one aperture therethrough which is configured to align;

a pin is removably placed through the at least one aperture locking the apparatus for lifting and lowering manhole covers in place.

10. The apparatus for lifting and lowering manhole covers of claim 6, further comprising at least one hook secured to the winch, wherein the at least one hook is configured to secure to a manhole cover.

* * * * *